United States Patent [19]

Raith

[11] Patent Number: 5,546,443
[45] Date of Patent: Aug. 13, 1996

[54] COMMUNICATION MANAGEMENT TECHNIQUE FOR A RADIOTELEPHONE SYSTEM INCLUDING MICROCELLS

[75] Inventor: Alex K. Raith, Kista, Sweden

[73] Assignee: Ericsson GE Mobile Communications, Inc., Research Triangle Park, N.C.

[21] Appl. No.: 966,461

[22] Filed: Oct. 26, 1992

[51] Int. Cl.⁶ .................................................... H04Q 7/36
[52] U.S. Cl. .......................... 379/59; 455/33.1; 455/33.4; 455/56.1
[58] Field of Search .............................. 379/59; 455/33.1, 455/33.2, 33.3, 33.4, 34.1, 34.2, 51.1, 51.2, 54.2, 56.1

[56] References Cited

U.S. PATENT DOCUMENTS

| | | |
|---|---|---|
| 3,898,390 | 8/1975 | Wells et al. . |
| 4,127,744 | 11/1978 | Yoshikawa et al. . |
| 4,128,740 | 12/1978 | Graziano . |
| 4,144,409 | 3/1979 | Utano et al. . |
| 4,144,411 | 3/1979 | Frenkiel . |
| 4,144,412 | 3/1979 | Ito et al. . |
| 4,144,496 | 3/1979 | Cunningham et al. . |
| 4,527,284 | 7/1985 | Röttger . |
| 4,551,852 | 11/1985 | Grauel et al. . |
| 4,597,105 | 6/1986 | Freeburg . |
| 4,639,937 | 1/1987 | McRae et al. . |
| 4,675,863 | 6/1987 | Paneth et al. . |
| 4,696,051 | 9/1987 | Breeden . |
| 4,723,266 | 2/1988 | Perry . |
| 4,726,014 | 2/1988 | Goldman et al. . |
| 4,771,448 | 9/1988 | Koohgoli et al. . |
| 4,775,998 | 10/1988 | Felix et al. . |
| 4,797,947 | 1/1989 | Labedz . |
| 4,932,049 | 6/1990 | Lee . |
| 4,965,849 | 10/1990 | Kunihiro . |
| 4,984,247 | 1/1991 | Kaufmann et al. . |
| 5,014,344 | 5/1991 | Goldberg . |
| 5,038,399 | 8/1991 | Bruckert . |

(List continued on next page.)

FOREIGN PATENT DOCUMENTS

| | | |
|---|---|---|
| 0335846 | 2/1989 | European Pat. Off. . |
| 2338611 | 8/1977 | France . |
| 61-32444 | 6/1987 | Japan .................................. 455/56.1 |
| 2242805 | 10/1991 | United Kingdom . |
| 2242806 | 10/1991 | United Kingdom .................. 455/33.2 |
| 2252699 | 8/1992 | United Kingdom . |
| WO93/12589 | 6/1993 | WIPO . |

OTHER PUBLICATIONS

"The Future of Cellular Telephony" by Håkan Jansson et al., Ericsson Review No. 1, 1990 pp. 42–52.

IEEE Transactions on Vehicular Technology Article, "A New Scheme for Multitransmitter Simulcast Digital Mobile Radio Communication", by Hattori et al., vol. VT–29, No. 2, May 1980, pp. 260–270.

Patent Abstracts of Japan, vol. 13, No. 541 (E-854) JP 1223834, Sep. 1989.

Patent Abstracts of Japan, vol. 16, No. 236 (E-1210) JP 4047722, Feb. 1992.

"Criteria For Cell Selection and Reselection" –CR to GSM 05.08, Jan. 1992, p. 11, section 6.4.

"The Evolution of Digital Cellular Into Personal Communications" by Uddenfeldt and Swerup, presented at Telecom 91, Geneva, Oct. 7–15, 1991.

"Capacity Improvement by Adaptive Channel Allocation" by Håkan Eriksson, IEEE, Mar. 1988, pp. 1355–1359.

Primary Examiner—Dwayne D. Bost
Attorney, Agent, or Firm—Burns, Doane, Swecker & Mathis, L.L.P.

[57] ABSTRACT

In a radiotelephone system, the control channel in all cells in an area can be simulcasted. A microcell base station may be provided with a receiver to listen on the umbrella cell control channel for messages, in addition to listening on its own control channel for control information and call accesses, to facilitate the appropriate assignment of a call to a cell. Also, a microcell can share a control channel with an umbrella cell provided interference between the control channels is not excessive. Further, microcells can share a common control channel independent of the overlying macrocell structure.

2 Claims, 5 Drawing Sheets

U.S. PATENT DOCUMENTS

| | | |
|---|---|---|
| 5,038,403 | 8/1991 | Leitch . |
| 5,040,238 | 8/1991 | Comroe et al. . |
| 5,042,083 | 8/1991 | Ichikawa . |
| 5,046,128 | 9/1991 | Bennett . |
| 5,058,201 | 10/1991 | Ishii et al. . |
| 5,067,147 | 11/1991 | Lee . |
| 5,067,173 | 11/1991 | Gordon et al. . |
| 5,081,704 | 1/1992 | Umeda et al. . |
| 5,088,108 | 2/1992 | Uddenfeldt et al. . |
| 5,257,399 | 10/1993 | Kallin et al. ............................ 379/59 |
| 5,263,177 | 11/1993 | Schieve et al. ....................... 455/33.4 |
| 5,305,371 | 4/1994 | Saegusa et al. ....................... 455/33.4 |
| 5,357,559 | 10/1994 | Kallin et al. .......................... 455/56.1 |

COMMUNICATION MANAGEMENT TECHNIQUE FOR A RADIOTELEPHONE SYSTEM INCLUDING MICROCELLS

BACKGROUND

The present invention relates to a control technique for a radiotelephone communication system, and more particularly, to a control technique for a wireless communication system.

Continuing growth in telecommunications is placing increasing stress on the capacity of cellular systems. The limited frequency spectrum made available for cellular communications demands cellular systems having increased network capacity and adaptability to various communications traffic situations. Although the introduction of digital cellular systems has increased potential system capacity, these increases alone may be insufficient to satisfy added demand for capacity and radio coverage. Other measures to increase system capacity, such as decreasing the size of cells in metropolitan areas, may be necessary to meet growing demand.

Interference between communications in cells located near one another creates additional problems, particularly when relatively small cells are utilized. Thus, techniques are necessary for minimizing interference between cells. One known technique is to group cells into "clusters". Within individual clusters, communications frequencies are allocated to particular cells in a manner which attempts to maximize the uniform distance between cells in different clusters which use the same communication frequencies. This distance may be termed the "frequency reuse" distance. As this distances increases, the interference between a cell using a communication frequency and a distant cell using that same frequency is reduced.

Radio base stations are often located near the center of each cell to provide radio coverage throughout the area of the cell. Alternatively, a radio base station may be located near the center of three adjacent "sector cells" to cover those cells. The choice between a sectorized and non-sectorized system is based on various economical considerations such as equipment costs for each base station.

Localized microcells and picocells may be established within overlying macrocells to handle areas with relatively dense concentrations of mobile users, sometimes referred to as "hot spots". Typically, microcells may be established for thoroughfares such as crossroads or streets, and a series of microcells may provide coverage of major traffic arteries such as highways. Microcells may also be assigned to large buildings, airports, and shopping malls. Picocells are similar to microcells, but normally cover an office corridor or a floor of a high-rise building. The term "microcells" is used in this application to denote both microcells and picocells, and the term "macrocells" is used to denote the outermost layer of a cellular structure. An "umbrella cell" can be a macrocell or a microcell as long as there is a cell underlying the umbrella cell. Microcells allow additional communication channels to be located in the vicinity of actual need, thereby increasing cell capacity while maintaining low levels of interference.

The design of future cellular systems will likely incorporate macrocells, indoor microcells, outdoor microcells, public microcells, and restricted microcells. Macrocell umbrella sites typically cover radii in excess of 1 kilometer and serve rapidly moving users, for example people in automobiles. Microcell sites are usually low power, small radio base stations, which primarily handle slow moving users such as pedestrians. Each microcell site can be viewed as an extended base station which" is connected to a macrocell site through digital radio transmission or optical fibers.

In designing a microcell cluster, it is necessary to allocate spectrum to the microcells. This can be done in several ways; for example, microcells can reuse spectrum from distant macrocells; a portion of the available spectrum may be dedicated for microcell use only; or a microcell can borrow spectrum from an umbrella macrocell.

In dedicating spectrum to the microcells, a portion of the available spectrum is reserved strictly for the microcells and unavailable to macrocells. Borrowing spectrum involves taking frequencies available to a covering macrocell for microcell use.

Each of these channel allocation methods has accompanying advantages and drawbacks. Reusing channels from distant macrocells causes little reduction in capacity of the macrocell structure. However, reuse is not always feasible because of co-channel interference between the microcells and macrocells.

By dedicating spectrum to the microcell, interference between cell layers (microcell and macrocell) is reduced because any co-channel interference is between microcells, not between macrocells and microcells. When dedicating spectrum to a microcell, that spectrum is taken from the entire macrocell system in a certain area, e.g., a city. Thus, that spectrum is not available for macrocell use. As a result, in an area containing only a few microcells, capacity is adversely affected because the microcells cover only a small portion of the area in the macrocell area while the macrocell, with a reduced amount of spectrum available, must cover a substantial area. Nevertheless, as the number of microcells increases and the area covered by only the macrocell decreases, capacity problems associated with dedicating spectrum may be reduced and a total net gain in overall system capacity can be achieved without introducing blocking in the macrocells.

Borrowing channels from an umbrella macrocell, like reuse, presents potential co-channel interference between microcells and macrocells. Also, capacity may be adversely affected because efficient spectrum allocation is often impossible. For example, it may be difficult to address all the hot spots in a cell simultaneously when borrowing or dedicating spectrum. An advantage of borrowing spectrum is that the entire macrocell system is not affected, unlike dedicating spectrum, because only spectrum allocated to a covering macrocell is borrowed and not spectrum from the entire system. Thus, other macrocells can use the same spectrum which is being borrowed by a microcell from its covering macrocell.

Further, in cluster design, allocated spectrum must be distributed to individual microcell sites. Known methods employed for spectrum allocation include fixed frequency planning, dynamic channel allocation (DCA), and adaptive channel allocation (ACA). Further, a control channel management technique must be selected. One possibility includes having each cell or sector in a sectorized system use a unique control channel until frequency reuse is feasible from an interference point of view.

With the introduction of microcells, radio network planning may increase in complexity. The planning process is largely dependent upon the structure of the microcells. For example, the sizes of streets, shopping malls, and buildings are key design criteria. Microcells suffer from a series of problems including an increased sensitivity to traffic variations, interference between microcells, and difficulty in anticipating traffic intensities. Even if a fixed radiotelephone communication system could be successfully planned, a change in system parameters such as adding a new base station to accommodate increased traffic demand may require replanning the entire system. For these reasons, the introduction of microcells benefits from a system in which channel assignment is adaptive both to traffic conditions and to interference conditions.

One of the main concerns associated with microcells is the minimization of frequency planning in FDMA and TDMA systems or power planning in a CDMA system. Radio propagation characteristics which are dependent on environmental considerations (e.g., terrain and land surface irregularities) and interference are difficult to predict in a microcellular environment, thereby making frequency or power planning extremely difficult if not impossible. One solution is to use an ACA scheme which does not require a fixed frequency plan. According to one implementation of this method, each cell site can use any channel in the system when assigning a radio channel to a call. Channels are allocated to calls in real time depending on the existing traffic situation and the existing interference situation. Such a system, however, may be expensive since more channel units on the average must be installed.

Several advantages are realized with ACA. There is almost no trunking efficiency loss since each cell can use any channel. Thus, it is possible to employ cells with very few channels without losing network efficiency. Further, channel reuse is governed by average interference conditions as opposed to the worst-case scenario.

Several ACA schemes attempt to improve traffic capacity and avoid the need for frequency planning. While some systems have been moderately effective in accomplishing these goals, it has been very difficult to fully achieve both goals in a system which has preassigned control channels, i.e., a system having specified frequencies on which a mobile station may expect a control channel (a 30 KHz RF channel which contains control signals). Systems having preassigned control channels include AMPS (Advanced Mobile Phone Service System), IS-54 (Revision B) and TACS (Total Access Communication System). In such systems, frequency planning is still needed for control channels. However, frequency planning can be avoided and traffic capacity improved by eliminating the need to plan a number of voice channels on each site in an area where traffic channels are expected to be non-uniformly distributed.

In many systems, microcells may be control channel limited rather than voice channel limited for capacity. For example, in a 7/21 cell plan commonly used in the AMPS system, frequencies are assigned to ensure that cells using the same frequency are separated by a reuse distance which maintains interference below certain predetermined criteria, e.g., carrier to interference (C/I) ratio. In a 7/21 macro system, the spectrum of each cluster is divided into 21 frequency groups, each group containing a number of channels distinct from each other group. There are seven sites each with three sectors in a 7/21 plan. Each sector is assigned to one frequency group. In the area outside the seven sites, the frequency is reused, i.e., the same frequencies may be used again in adjacent clusters.

In a typical 7/21 cellular system, each base station represents a site and each cell represents a sector. A microcell located within an umbrella cell is unable to use the same frequency as the umbrella cell unless there is a very high penetration loss to an area inside the microcell. As a result, the spectrum from the microcell must be reused from a distant macrocell, borrowed from the umbrella cell, or dedicated from the spectrum available to the cellular system.

When reusing spectrum from a distant macrocell, the number of macrocells from which frequency may be reused is based on the radio propagation environment (i.e., the terrain between the cells) and the interference criteria. The reuse distance is designed so that co-channel interference is limited to acceptable ranges. For example, in the AMPS system, the desired signal preferably ranges from ten to one hundred times greater than the interfering signal.

In addition to reusing spectrum in a microcell from a distant macrocell, assuming no spectrum has been dedicated, generally referred to as "reuse assignment", two other reuse processes exist, one for the entire macro system and one where the assigned spectrum is reused inside the area (cluster) of the micro system. If it is possible to assign spectrum of the macrocell to the microcell from only two distant macrocells as a result of interference, the microcell area will have only two control channels. The number of voice channels depends on how many voice channels are assigned to these particular macrocells. In systems currently employed in the United States (the "cellular band" with two operators) there are approximately 400 channels available per system. The average macrocell (sector) in a 7/21 plan has approximately eighteen voice channels. Therefore, when beginning the planning process for the microcell area, there are thirty-six voice channels and two control channels.

An omnicell system uses one base station for each cell. In an omnicell system, for example, a 12/12 system, the interference distribution may differ from that of the 7/21 system. In certain operating environments in the microcell, it may be possible to have for example a twelve-site reuse plan since the same quality aspects must be achieved. Thirty-six voice channels with fixed frequency planning on a twelve-site reuse plan may result in three channels per site. The thirty-six voice channels can be allocated to another set of sites adjacent to the first twelve sites, but there are only two control channels. A two-site reuse plan in a two dimensional cluster area results where the same frequency is used in adjacent cells. In this example, only two cells can be installed. Thus, the quality criteria for the above example which requires a minimum twelve-cell reuse plan cannot be satisfied to achieve sufficient radio link quality. Accordingly, such microcell channel systems may be control channel limited, i.e., the intended cell cluster cannot operate properly because the control channels will be jammed with co-channel interference.

A potential solution to this problem is to increase the size of microcells by, for example, increasing the power, so that two microcells provide sufficient radio coverage. According to this solution, spectrum reuse is no longer required assuming radio coverage, and not capacity, is the primary concern in planning the microcell area. However, this may not be possible because interference between the microcells and macrocells may exceed acceptable levels. To overcome this problem, two microcells may be used in conjunction with many antennas in a distributed antenna system. This allows the area of coverage to extend over the microcell cluster area without requiring a high relative transmission power because the mobiles at the fringe of a cell will be closer to one of the antennas in comparison to a single antenna system.

This type of implementation has limitations. Additional RF cabling is necessary which results in attenuated signals. If the microcell system area is large, there may be insufficient power left at the remote antenna. In turn, this might require a costly high power amplifier in the base station. Moreover, when high power base station transmitters compensate for cable loss, mobile stations also must transmit with high power to overcome the cable loss. Therefore, there is little incentive to design the power amplifier in the base station to permit transmission higher than the power transmitted from the mobile (AMPS hand-held 0.6 watt) in the uplink, taking into account gain (4–7 dB) attributable to antenna diversity at a typical base station. One drawback with such systems is that mobiles are forced to transmit with relatively more power, thereby shortening the battery life in a mobile station and undermining one of the purposes for introducing microcells. More importantly, high powered mobiles are more likely to interfere with macrocells using the same spectrum unless the microcells use a dedicated spectrum.

Alternatively, a system employing distributed power amplifiers in conjunction with optical fibers may be used. According to such a system, a remote controller would transmit a light signal which would be amplified. The signal would be received locally where it is converted back to a radio signal. Losses associated with cabling in a system employing optical fibers may be minimized because the signals do not need to be amplified very often and in most typical scenarios not at all. Further, an optical fiber system provides added flexibility and can be easily installed. However, it is expensive to implement a system having optical interfaces.

When planning an antenna system, allocating spectrum for a microcell cluster, and selecting a power level for microcell transmitting power, several concerns must be addressed. Sufficient radio coverage, e.g., 98%, must be provided within the microcell area. Also, if the spectrum allocated to the microcell cluster has been reused from a distant macrocell, the power level of the microcells must be low enough to avoid interference with the distant macrocell from which the spectrum was reused. Further, the power of the control channel in the microcell may have to be stronger than the power of the covering umbrella macrocell control channel if the mobile is to lock on to the microcell. In sum, the aim of such a system is to assign as many mobiles as possible to microcell control channels by maintaining those control channels stronger than the control channels of the umbrella macrocell in the intended microcell area while transmitting with a sufficiently low power to avoid interference with the distant macrocell.

Power or interference limitations can result in a voice channel limited system where some of the mobiles in the microcells will receive a stronger signal from an overlying macrocell. The number of mobiles receiving a stronger signal from an overlying macrocell will increase as the distance between the umbrella cell and the microcell is shorter. Consequently, capacity might not increase since mobiles are locked-on to the macrocell. Moreover, if mobile transmitting power requirements increase, the battery life of the current portables would correspondingly decrease to maintain the equivalent level of performance. Further, blocking and intermodulation distortion may arise with mobiles located inside the microcell area, close to the microcell base station, but power controlled by a macrocell. The mobiles are power controlled by the umbrella macrocell and require more power to communicate with the umbrella macrocell than the microcell.

SUMMARY

Conventional systems may be both control channel and voice channel limited. A microcell system under a macrocell system may be limited to two control channels as shown in the example set forth above. Thus, a need exists for a control channel management scheme for the efficient use and allocation of control channels.

According to the present invention a control channel may be simulcast, i.e., the same information can be broadcast at the same time on the same frequency, so that more than one cell can use a common control channel. There are several exemplary simulcasting schemes in accord with aspects of the present invention. In one embodiment, a control channel is simulcast among two or more microcells such that the system is completely independent of the macrocell environment. The microcells may also have listening devices tuned to the umbrella cell control channel.

In a second embodiment, a control channel of an umbrella cell is simulcast with a control channel of a microcell. Thus, the microcell may have listening or receiving devices tuned to the macrocell control channel.

In yet another embodiment, each microcell may contain a listening device to listen to the umbrella cell control channel and each microcell also may have its own control channel which is different from the umbrella cell control channel.

The system and method according to the present invention involves establishing a connection between a base station and a mobile station in a radiotelephone system having at least two cells. At least two microcells or one microcell and an umbrella cell listen for a call access request on a control channel. Upon receiving a call access request, the respective cells simultaneously transmit control information on the control channel. The same control information is transmitted by the transmitting cells at the same time on the same frequency. In this application this is referred to as "simulcasting".

In one embodiment, the control channel may reuse a broadcast frequency assigned to a control channel of an umbrella cell which overlies the microcells. The radio coverage of the microcells and the radio coverage of the umbrella cell may overlap or may be substantially non-overlapping. In another embodiment, the control channel may reuse a broadcast frequency of a distant macrocell and be shared (simulcasted) among at least two microcells.

A system and method for establishing communications in a multi-layered radiotelephone system having at least one microcell includes receiving a call access request from a mobile unit on a first control channel assigned to an umbrella cell and receiving the call access request from the mobile unit on a second control channel assigned to a microcell wherein the first and second control channels use the same frequency. The radio coverage of the umbrella cell may partially overlap the radio coverage of the microcell. The call associated with the call request may be assigned to the microcell, for example by ordering the mobile unit over the first control channel device to tune to an accessible voice channel of the microcell for handling a call. The assignment may be based on which cell has a higher received signal strength or other criteria such as signal link quality or planned cell configuration. Further, a mobile unit may be ordered over the first control channel device to tune to an accessible voice channel of another cell to which the call is to be assigned.

BRIEF DESCRIPTION OF THE DRAWINGS

The present invention will now be described in more detail with reference to preferred embodiments, given only by way of example, and illustrated in the accompanying drawings, in which.

DETAILED DESCRIPTION

Although the following description is in the context of cellular communication systems involving portable or mobile radio telephones and/or personal communication networks, it will be understood by those skilled in the art that the present invention may be applied to other communication applications.

Figure 1:
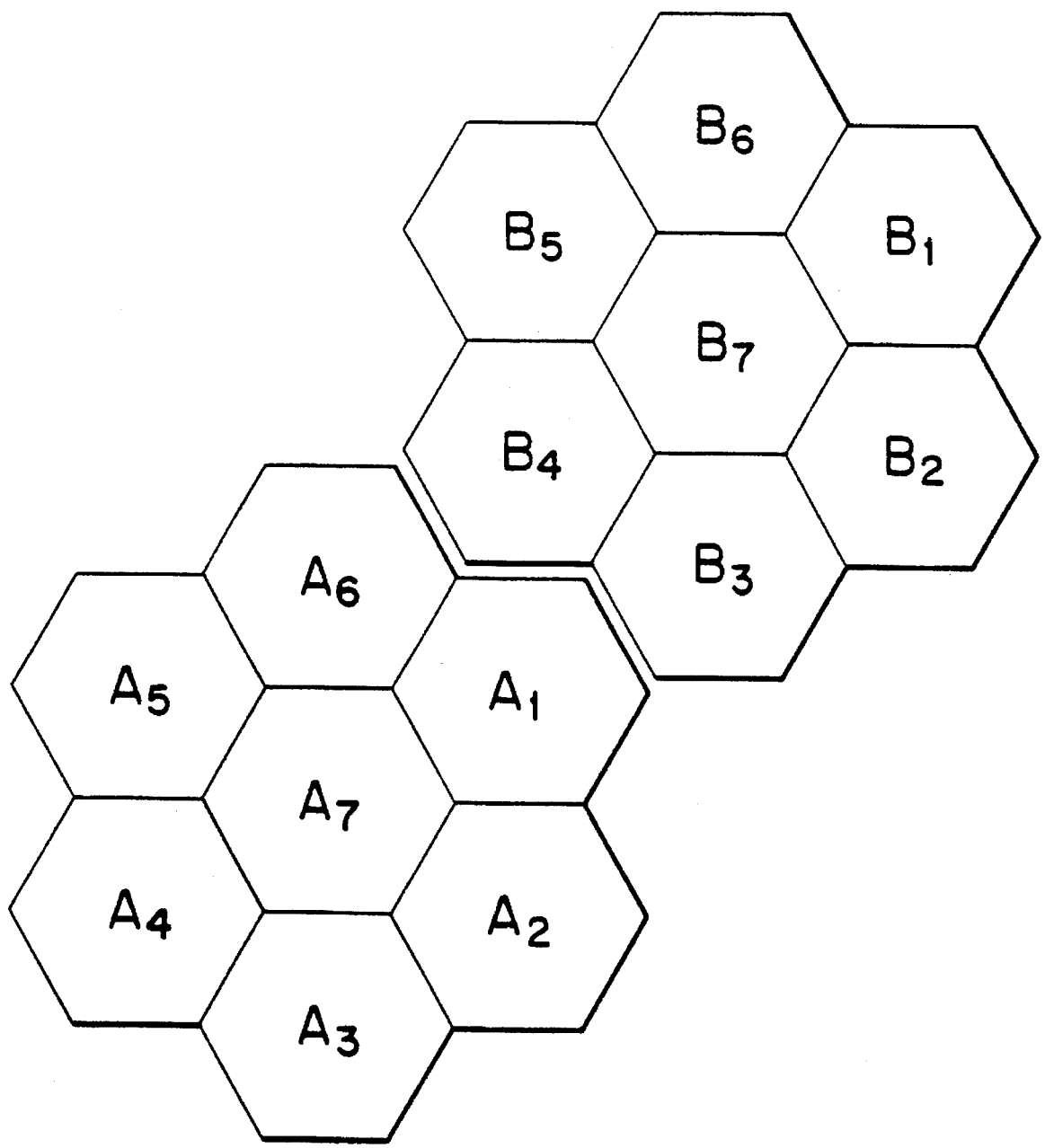
FIG. 1 is a cell plan illustrating two cell clusters in a cellular mobile radiotelephone system.

FIG. 1 illustrates a first cell cluster A and a second cell cluster B forming part of a cellular mobile radio telephone system in a known manner. Typically, all frequencies available in the system are used in each cell cluster. Within an individual cell cluster, the frequencies are allocated to different cells to achieve the greatest uniform distance, known as the frequency reuse distance, between cells in different clusters using the same frequency. In FIG. 1, cells $A_1$ and $B_1$ use a common frequency; cells $A_2$ and $B_2$ use a common frequency; and cells $A_3$ and $B_3$ use a common frequency, etc. The radio channels in cells $A_1$ and $B_1$ using the same frequency are referred to as co-channels because they use the same frequency. Although some interference will occur between co-channels, the level of such interference in an arrangement such as that of FIG. 1 is normally acceptable. The cell plan of FIG. 1 allows for a relatively simple frequency allocation and provides reduced co-channel interference in low traffic conditions. However, as noted above, limitations in high traffic areas restrict the use of this cell plan. For example, traffic in hot spots can produce blocking.

Figure 2:
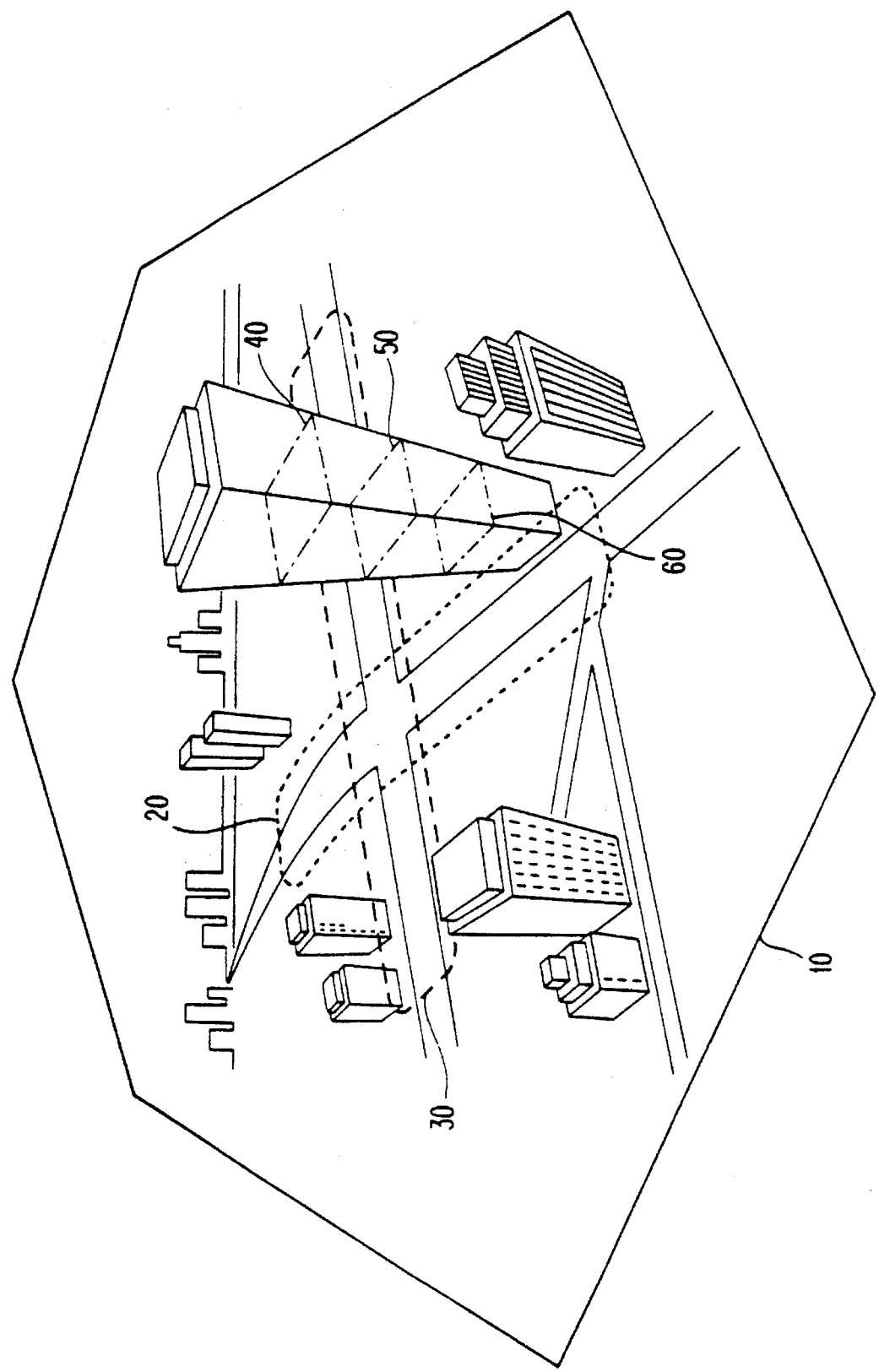
FIG. 2 illustrates a typical multi-layered cellular system employing umbrella macrocells, microcells and picocells.

FIG. 2 is an exemplary multi-layered cellular system. An umbrella macrocell 10 represented by a hexagonal shape makes up an overlying cellular structure. Each umbrella cell may contain an underlying microcell structure. The radio coverage of the umbrella cell and an underlying microcell may overlap or may be substantially non-overlapping. The umbrella cell 10 includes microcells 20 represented by the area enclosed within the dashed line and microcells 30 represented by the area enclosed within the dotted line corresponding to areas along city streets, and microcells 40, 50, and 60, which cover individual floors of a building. The intersection of the two city streets covered by the microcells 30 and 40 may be an area of dense traffic concentration, and thus might represent a hot spot.

Briefly, control channels are used for setting up calls, informing the base stations about location and parameters associated with mobile stations, and informing the mobile stations about location and parameters associated with the base stations. The base stations listen for call access requests by mobile stations and the mobile stations in turn listen for paging messages. Once a call access message has been received, it must be determined which cell should be responsible for the call. Generally, this is determined by the signal strength of the mobile station received at the nearby cells. Next, the assigned cell is ordered, by the mobile switching center (MSC) for example, to tune to an available voice channel which is allocated from the set of voice channels accessible to the assigned cell.

Frequency planning can be minimized by simulcasting the control channel where a group of microcells transmit the same information at the same time on the same frequency. This is often referred to as macro diversity. In contrast to other methods, only the control channel is shared by the base stations.

Macro diversity is employed to improve reception performance. By simulcasting the control channel, it is not necessary to plan the control channel. Further, the microcell systems may be capacity limited in the number of control channels which can be employed rather than in the number of voice channels, e.g., AMPS. To ameliorate the control channel problem, according to one embodiment of the present invention, one control channel is transmitted from a number of cells. In other words, one control channel may be simulcast to and/or from several base stations. It may also be possible to use a few or only one microcell as discussed previously when considering the control channel limitations. However, the preplanning required before implementation, for example determining where to locate the microcell to best meet the system goals, may increase substantially.

In a macrocellular environment, particularly one including indoor microcells, simulcasting a control channel can be beneficial. For example, the problems associated with power planning, i.e., the signal strength necessary to avoid interference, may be reduced. Since fewer control channels can be used when simulcasting, the likelihood of a microcell control channel and a macrocell control channel interfering which is often present in a macrocell/microcell reuse scheme at the fringe of an indoor microcell can be reduced. Further, with a limited channel capacity, simulcasting theoretically may reduce the number of channels which must be assigned as control channels. However, in some systems such as AMPS, as a practical matter this is not possible because a fixed number of channels have already been allocated as control channels.

In an exemplary system requiring eighteen microcells to service a hot spot using a twelve-site reuse plan, all twelve base stations within one cluster use different frequency channels. However, six of those base stations must share the same spectrum with the remaining six microcells (base stations) located in another incomplete cluster. A single control channel may be simulcast from each base station. Capacity considerations such as accesses and pages on the control channel may require that two control channels are used and assigned to for example, nine microcells each assuming reuse from two distant macrocells.

For a fixed frequency planned system with thirty-six voice channels available using a twelve-site reuse plan, each microcell can be assigned three channels. However, with ACA or DCA there is no set number of voice channels assigned to each microcell. Each base will have the capabilities through transmitting means, receiving means and communication links to handle channels in excess of three channels. The best performance can be achieved if each base station can handle all voice channels, i.e., thirty-six voice channels, in IS-54 thirty-six frequencies with three time slots each. Nevertheless, designing each base station equipped with all voice channels may be costly. To determine the feasibility of such an arrangement, the marginal capacity return of a system having additional channels available to each base station above the average number of usable channels must be compared to the cost of the additional hardware necessary to implement such a system. A channel is usable if it is capable of maintaining sufficient link quality of all calls.

ACA can typically improve traffic capacity by a factor of 1.5 to 5, depending on its implementation. In the above example, if a factor of two is selected, a single microcell can use on average six channels at a time. Usually, an average of six channels per microcell is sufficient to handle the traffic for the particular hot spot area. Of course, the number of channels may vary from cell to cell, for example one cell may average three channels and another nine, such that blocking is maintained below a certain design criteria such as 2% of the time. However, the additional expense to increase the average channel capacity of each microcell to far more than six channels is probably not economical. The key in such planning is to find the point of diminishing return when setting an average channel capacity per cell.

According to the present invention, the umbrella macrocell and the microcell may use the same frequency for control channels. Both the macrocell and the microcell base stations include a transmitting portion and a receiving portion corresponding to the shared control channel. One of the microcell receivers listens on the control channel assigned to the macrocell. The microcell and macrocell transmit information to the MSC about all successfully received accesses. When the MSC receives an access message, it determines to which cell the mobile should be assigned. The mobile waits for an answer on the shared control channel. Therefore, the MSC sends a message to the mobile on the shared control channel containing an order to tune to a voice channel which is part of the assigned cell channel list.

There are some application limitations concerned with this embodiment. If many microcell clusters are located in the same umbrella macrocell, the capacity of the control channel (accesses and paging) limits system capacity. Assuming 25% of the microcell is covered by radio frequency of the umbrella macrocell, more than 25% of access attempts in the microcell area will create successful messages of low signal strength and interference of sufficient degree to block other accesses in the macrocell. This situation is likely in fringe areas of the microcell where the radio frequency of the umbrella macrocell may penetrate into the microcell coverage area.

However, if the control channel frequency for the microcell and the umbrella macrocell differ, the majority of the mobiles will create accesses on the separate microcell control channel since the majority of mobiles in the microcell area will lock on to the strongest received control channel, typically the microcell control channel. When using the same control channel frequency, all mobiles transmit on the same frequency with some of them reaching only the microcell, but still creating interference to the macrocell. Consequently, access collisions can occur in the macrocell reducing control channel capacity more than necessary. This may result because microcell base stations are typically equipped with lower power amplifiers than macrocell base stations, thus the power of the microcell control channel is limited. Also, the power limits imposed on microcell base stations when combined with the attenuation present in cabling make it difficult for the microcell base stations to overpower the macrocell base stations in fringe areas. Further, it may be difficult to synchronize a macrocell with a microcell cluster in comparison to synchronizing within the microcell cluster.

However, each microcell can be provided with a receiver device to listen on the control channel assigned to the macrocell in addition to the transmitter and receiver for the microcell control channel. The macrocell control channel informs the MSC about all successfully received call accesses. Thus, the MSC receives the same access message from mobiles which have locked on to the macrocell control channel from both the macrocell and from one of the microcells. The MSC then knows to assign the mobile to the microcell instead of the macrocell. The mobile waits for a message from the MSC on the macrocell control channel. Therefore, the MSC sends the message over the macrocell control channel. If the mobile has been granted a channel, the message sent contains an order to tune to a voice channel allocated on the channel list of the assigned cell, e.g., a microcell. Mobiles which can be served by the microcells can be assigned to microcells in order to minimize the voice capacity drain on the macrocell. It is to be understood that if the microcell has no frequencies available then the macrocell may be assigned the call.

In a system with each microcell having a receiver which listens to the macrocell control channel, several problems may arise. For example, in an indoor microcell environment the signal must get from the macrocell to the mobile to function properly; this requires penetration of the signals through the walls of structures, which can significantly weaken a signal. As a result, a listening control channel is probably best suited for an outdoor microcell environment or a microcell close to a macrocell.

Table 1 shows three ways channels and cells can be arranged according to the present invention. In exemplary embodiment 1, two microcells 1 and 2 share the same control channel (CC) transmitting (Tx) and receiving (Rx) frequency A independent of the macrocell control channel transmitting and receiving frequency B. In exemplary embodiment 2, the macrocell shares the control channel of at least microcell 1. (It will be understood that the frequencies for transmitting and receiving may be different although the channels are same, viz., the same duplex frequency pair; paired frequencies are separated by 45 Mhz in AMPS). In exemplary embodiment 3, the first control channels on all the cells are independent, while the second control channel receiving frequency of microcell 1 is the same as the macrocell control channel's transmitting and receiving frequency. Thus, the microcell 1 can listen on the macrocell control channel. A cell may be equipped with more than one listening control channel.

TABLE 1

| Exemplary embodiment 1 | Macrocell | Microcell 1 | Microcell 2 |
| --- | --- | --- | --- |
| CC Tx & Rx frequency | B | A | A |
| Exemplary embodiment 2 | | | |
| CC Tx & Rx Frequency | A | A | A or B |
| Exemplary embodiment 3 | | | |
| CC 1 Tx Frequency | A | B | C |
| CC 1 Rx Frequency | A | B | C |
| CC 2 Rx Frequency | B, C or none | A | E |

The foregoing table of arrangements is not exhaustive. Other combinations are considered to be within the scope of the invention. For example, exemplary embodiments 1 and 3 may be combined where the system includes a simulcast control channel at each microcell and a listening control channel at one or more of the microcells. Also, exemplary embodiments 2 and 3 may be combined with one or more of the microcells having a listening control channel. Additionally, a control channel may be simulcast by a macrocell and one or more microcells as in exemplary embodiment 1 and further another control channel on each microcell may be simulcast by two or more microcells.

Figure 3:
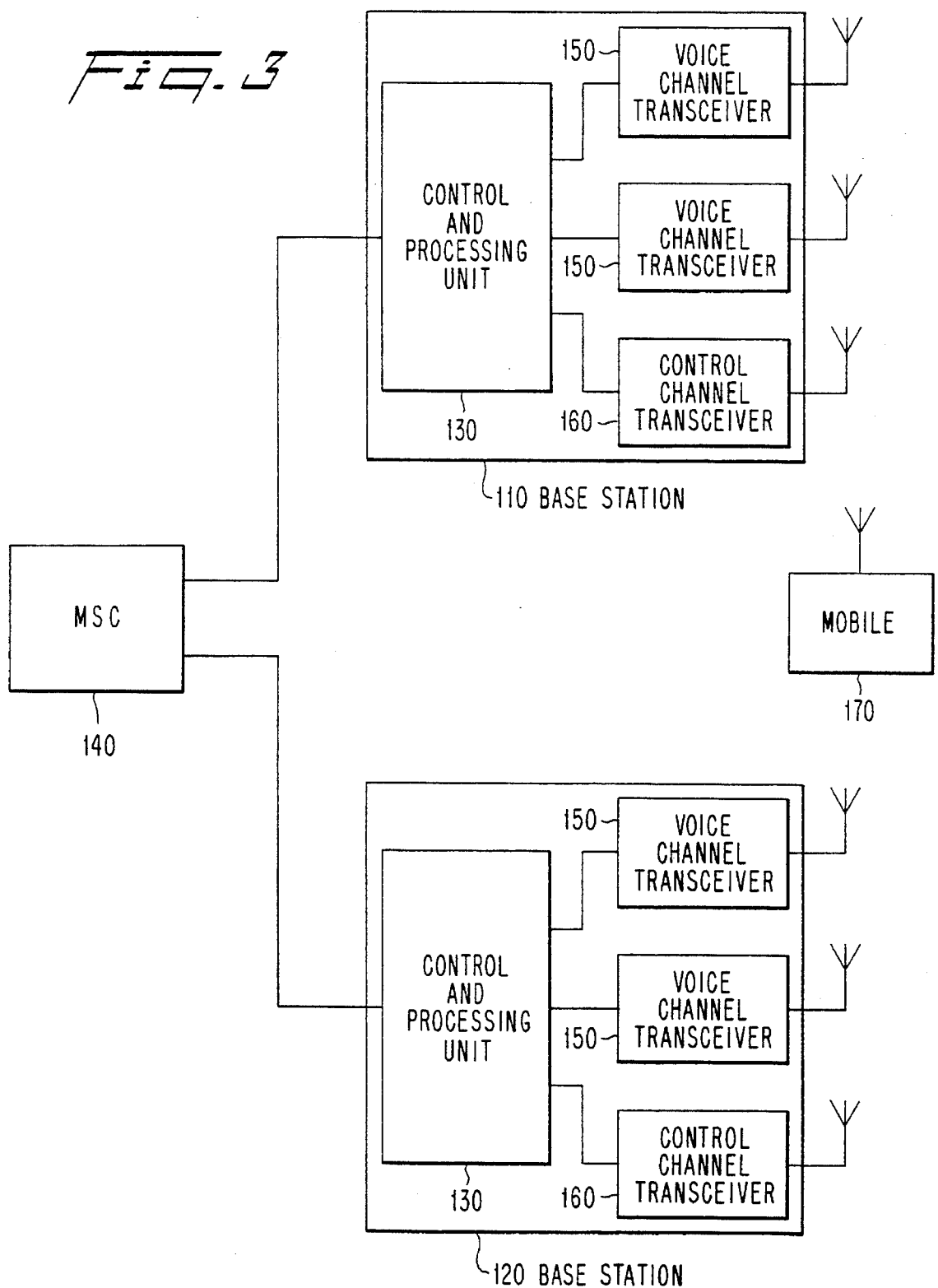
FIG. 3 represents an exemplary implementation of a system for a microcell and an umbrella cell of a radiotelephone system according to the present invention.

According to one aspect of the present invention, base stations of the umbrella macrocells and microcells may be equipped with several voice channel transceivers and one control channel transceiver, and optionally one or more listening control devices. FIG. 3 represents a block diagram of an exemplary cellular mobile radiotelephone system according to one embodiment of the present invention. The system has two base stations including a base station 110 associated with a microcell and a base station 120 belonging to either a microcell or umbrella cell. Each base station has a control and processing unit 130 which communicates with the mobile switching center (MSC) 140 which in turn is connected to the public switched telephone network (not shown).

Each base station includes a plurality of voice channel transceivers 150 which are controlled by the control and processing unit 130. Also, each base station includes a control channel transceiver 160. The control channel transceiver 160 is controlled by the control and processing unit 130. When mobile 170 makes a call access request, each control channel transceiver 160 receives a signal having a certain signal strength from the transmitting mobile 170. The received signal strength is then passed to the control and processing unit 130 and sent to the MSC 140. The MSC 140 evaluates each received signal strength associated with a call access request received and determines the cell to which the call is to be assigned. The MSC 140 then assigns the mobile 170 making the call access request to the appropriate cell. An order may be sent to the mobile 170 on the control channel with the highest received signal strength to tune to a particular voice channel of the assigned cell.

In the embodiment shown in FIG. 3, the base stations 110 and 120 share the same control channel frequency in the uplink direction. As a result, the control channel of the umbrella cell and the microcell, or the two microcells, may be simulcast from the cells.

Figure 4:
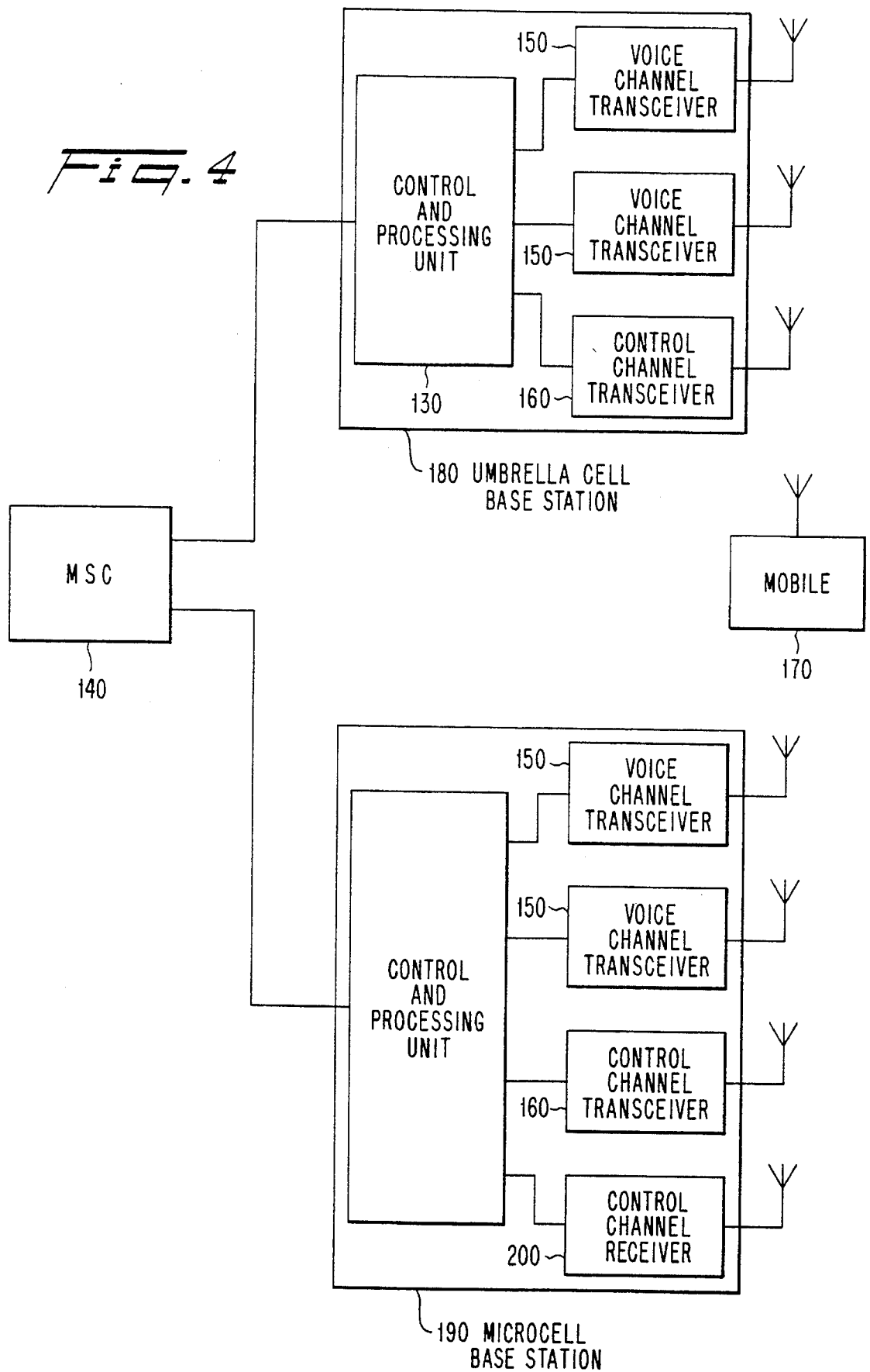
FIG. 4 represent another exemplary implementation of a system for a microcell and an umbrella cell of a radiotelephone system according to the present invention.

FIG. 4 relates to another embodiment of the present invention. Elements in FIG. 4 are the same as those represented by the same numerals in FIG. 3. In FIG. 4, there is shown an umbrella cell base station 180 and a microcell base station 190. The microcell base station 190 includes a control channel receiver 200 for listening on the umbrella cell control channel for information including the contents of mobile originated messages. Also included is a control channel transceiver 160 for the microcell which can, independent of the umbrella cell base station 180 and its corresponding control channel transceiver 160, receive call access requests from a mobile 170, preferably only if the mobile 170 is within the microcell area.

When a mobile 170 makes a call access request, it first determines on which control channel the request will be broadcast. Typically, the mobile 170 determines which control channel, as between the microcells and umbrella cells, is being received with a higher signal strength. If the mobile determines that a microcell control channel is strongest, then the access request is transmitted on that microcell control channel. However, if the mobile 170 determines that the umbrella cell control channel is the strongest, then the access request is sent over the umbrella cell control channel. In the latter case, the call access request may be received at both the microcell and the umbrella cell on the umbrella cell control channel if the microcell is equipped with a listening control channel tuned to the control channel receiving frequency of the umbrella cell.

Upon receipt of a call access request, the receiving cell transmits the information to the MSC 140. The MSC 140 assigns the call to the microcell or another cell based on, for example, the signal strength of the mobile 170 received on the control channels of the cells. The MSC 140 orders the mobile 170 on the control channel of the cell from which the call access was made to tune to a voice channel of the assigned cell. Specifically, the MSC 140 transmits a message including the frequency, the slot (in time division applications), and other information necessary to establish connection of the call.

Figure 5:
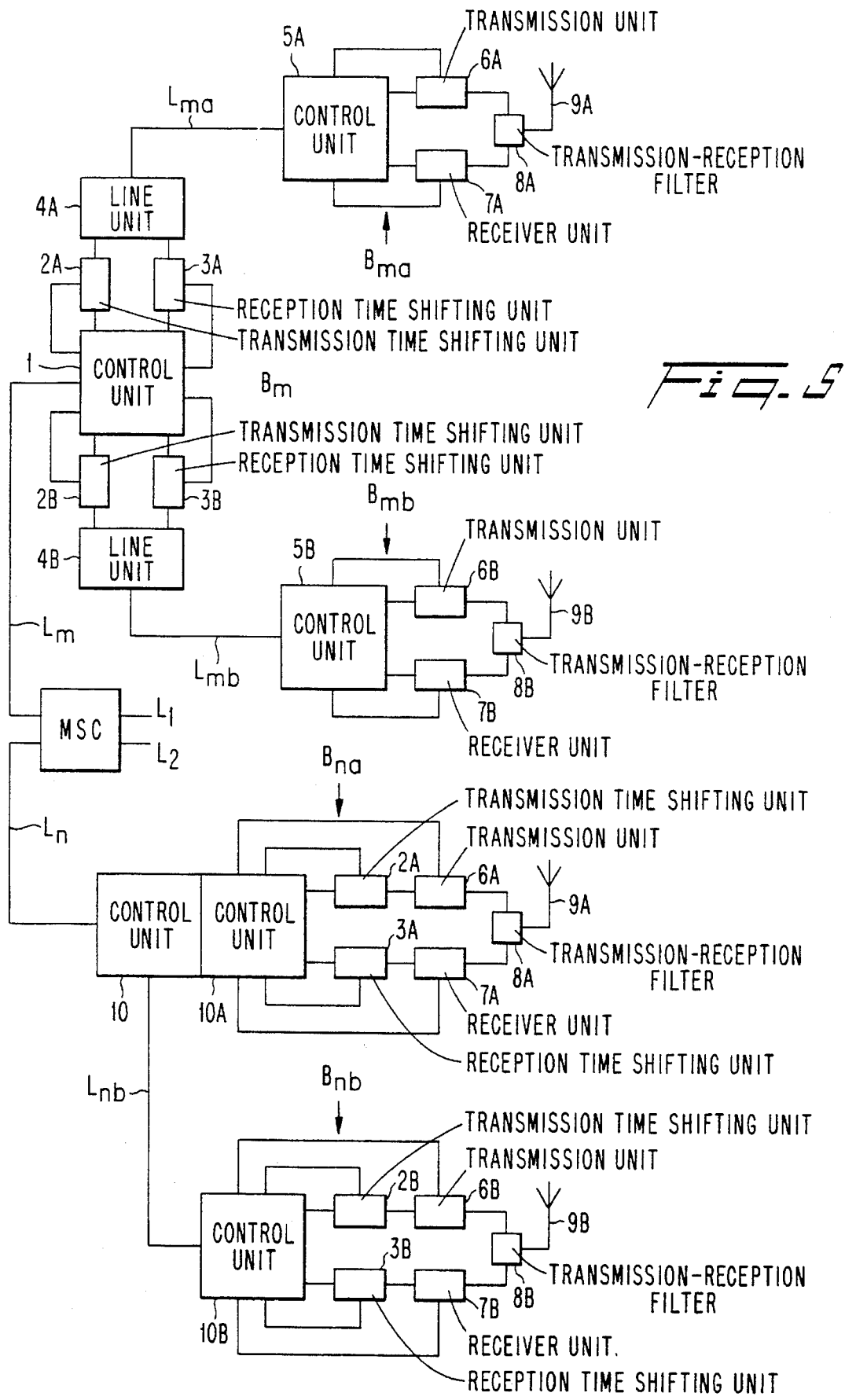
FIG. 5 illustrates a technique for synchronizing communications in accordance with one aspect of the present invention.

When simulcasting control channels according to the present invention, it is important to properly synchronize the base stations transmitting on the same control channel. One exemplary method which can be used is discussed in U.S. Pat. No. 5,088,108, entitled "Cellular Digital Mobile Radio System and Method of Transmitting Information in a Digital Cellular Mobile Radio System" by Uddenfeldt and the present inventor which is herein incorporated by reference. In FIG. 5, an MSC is connected via cables $L_1, L_2, \ldots L_m$, $L_n$ to a plurality of base stations, of which two $B_m$ and $B_n$ are shown. The base station $B_m$ has a central unit connected via cables $L_{ma}$ and $L_{mb}$ to two transceiver units $B_{ma}$ and $B_{mb}$ situated at a distance from the central unit. The central unit of the base station $B_m$ includes a central line and control unit 1, transmission time shifting units 2A and 2B for each transceiver, reception time shifting units 3A and 3B for each transceiver, and line units 4A and 4B for each transceiver.

Both transceivers in the base station $B_m$ are alike with each transceiver containing a line and control unit 5A or 5B, transmitter units 6A or 6B, receiver units 7A or 7B, a transmission reception filter 8A or 8B and an antenna 9A or 9B.

The base station $B_n$ differs somewhat from the base station $B_m$ primarily because its central line and control unit 10 are connected with one of its transceivers $B_{na}$. Thus, in this base station no cabling is associated with line units corresponding to $L_m$, $L_{mb}$, and 4A–5B is needed for transceiver $B_{na}$. Further, no transmission or reception time shifting units are included in any central unit of $B_n$, but corresponding units 2A, 2B, 3A, and 3B respectively are included in transceivers $B_{na}$ and $B_{nb}$.

Messages broadcast on the control channel to the mobile units from the MSC are transmitted from the MSC via the cable $L_m$ to the line and control unit 1. The information is next transferred from the line and control unit i through the transmission time shifting unit 2A, line unit 4A, cable $L_{ma}$ and control unit 5A to the transmitting unit 6A. The transmitting unit 6A transmits via the transmission reception filter 8A and the antenna 9A radio signals on the control channel to the mobile units.

That same message information is also transferred from line and control unit 1 via the transmission line shifting unit 2b, line unit 4B, cable $L_{mb}$, and line and control unit 5B to the transmitting unit 6B in the transceiver $B_{mb}$. Subsequently, the transmitting unit 6B transmits via the transmission reception filter 8B and the antenna 9B radio signals on the control channel to the mobile units.

The signals from the antenna 9A in $B_m$ arrive at a given mobile station in a cell with or without time shift in relation to corresponding radio signals from the antenna 9B in $B_{mb}$. The possible time shift of arrival of the control channel at a mobile unit depends on possible time shifting at transmission from the antennas and propagation time from the antennas to the mobile unit.

The line and control unit 1 controls the variable delays in the transmission time shifting units 2A and 2B so that the differences in delay associated with cables $L_{ma}$ and $L_{mb}$ and the differences caused by the radio propagation delay are counteracted.

In systems with mobiles operating according to IS-54 in contrast to mobiles operating according to AMPS, simultaneous arrival of the radio signals at the mobile unit is neither desired nor achievable. Reflections occur in the propagation of the radio signals between the antennas, and each mobile unit is equipped with an adaptive equalizer to aid in reconstruction of the received signal. Therefore, it is not necessary for signals to arrive simultaneously at the mobile. On the contrary, there is preferably a small time shift to obtain protection against Rayleigh fading.

There are several methods for controlling the delay associated with these transmissions. For example, an estimate of the propagation delay can be made, and, in conjunction with the remaining causes of delay associated with the fixed part of the system, can be used to adjust the reception time shifting units 3A and 3B so that information from the mobile arrives at the line and control unit 1 of the corresponding transceiver $B_{ma}$ and $B_{mb}$ simultaneously. Subsequently, the delays in the transmission time shifting units 2A and 2B are adjusted in accordance with the optimum delays in the reception time shifting units 3A and 3B.

Another method involves estimating in the mobile station the difference in arrival time, or time shift, between the received radio signals from one transceiver $B_{ma}$ and from the other transceiver $B_{mb}$. Encoding of radio signals to indicate from which transceiver the signals were received is required. In TDMA and CDMA systems, one can transmit special synchronizing words. RAKE receivers can be used by the mobile unit to correlate the received signals and reconstruct the radio message transmitted by the respective base stations. Although the example synchronizes transmissions from two transceivers at the same base stations, transmissions from transceivers located at different base stations can likewise be synchronized to facilitate simulcasting of the control channel between a group of cells. This method however, cannot be used for analog mobiles operating according to AMPS.

Within a microcell cluster, if the macrocell is not part of the simulcast, synchronization becomes easier since differential delays in RF cabling and corresponding radio propagation between base and mobile are small because the distances involved are typically short in relation to the bit period of the modulation format, for example up to several km in AMPS. Existing mobile units can limit the flexibility in designing control channel assignment schemes. For example, the feasible power capacity of mobile units are presently limited by the size of the units and the characteristics of the energy sources.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for establishing communications in a multi-layered radiotelephone system having a plurality of microcells and an umbrella cell and a mobile switching center, comprising the steps of:

receiving a call access request on a first control channel assigned to the umbrella cell, wherein the first control channel has at least one predetermined radio frequency;

receiving said call access request on a second control channel assigned to a microcell wherein said second control channel has the at least one predetermined radio frequency; and assigning a call associated with said call access request to one of said microcell and said umbrella cell;

wherein each microcell has a respective additional control channel, at least two of said additional control channels having at least one common radio frequency, and control information is transmitted simultaneously on said additional control channels having the at least one common radio frequency.

2. A system for establishing communications in a multi-layered radiotelephone system having a plurality of microcells and an umbrella cell and a mobile switching center, said system comprising:

means for receiving a call access request on a first control channel assigned to an umbrella cell, wherein the first control channel has at least one predetermined radio frequency;

means for receiving said call access request on a second control channel assigned to a microcell wherein said second control channel has the at least one predetermined radio frequency; and means, included in the mobile switching center, for assigning a call associated with said call access request to one of said microcell and said umbrella cell;

wherein each microcell has a respective additional control channel, at least two of said additional control channels having at least one common radio frequency, and control information is transmitted simultaneously on said additional control channels having the at least one common radio frequency.

\* \* \* \* \*